United States Patent [19]

Brown et al.

[11] 4,420,740
[45] Dec. 13, 1983

[54] OBSTRUCTION WARNING SYSTEM

[76] Inventors: Herbert L. Brown, 671 Golf Course Dr., Ft. Walton Beach, Fla. 32548; Frederick J. Mayer, 1107 Clark St., Tallahassee, Fla. 32301

[21] Appl. No.: 297,637

[22] Filed: Aug. 31, 1981

[51] Int. Cl.³ .................. B64D 47/00; G08G 5/00
[52] U.S. Cl. .................................. 340/28; 340/331; 340/815.31; 362/32; 362/391
[58] Field of Search .............. 340/331, 28, 815.31, 340/114 R, 114 B; 362/32, 84, 62, 391; 441/16, 20

[56] References Cited

U.S. PATENT DOCUMENTS

| | | | |
|---|---|---|---|
| 2,095,306 | 10/1937 | Austin | 340/28 |
| 4,037,191 | 7/1977 | Deane et al. | 362/391 |
| 4,344,110 | 8/1982 | Ruediger | 362/32 |

Primary Examiner—James J. Groody
Attorney, Agent, or Firm—William M. Hobby, III

[57] ABSTRACT

An obstruction warning system apparatus is provided having elongated optical light path members each having a volume capable of transmitting light therethrough and having means to interrupt the light along the light path to render the light path member visible at a distance. The optical light path members are supported on guy wires or to an obstruction and have a high intensity light source operatively connected to one end of at least one elongated optical light path member and a reflector formed on the other end thereof for reflecting light from the light source back into the elongated optical light path member. A switching circuit may be provided for switching the light source between a plurality of elongated optical light source members.

11 Claims, 10 Drawing Figures

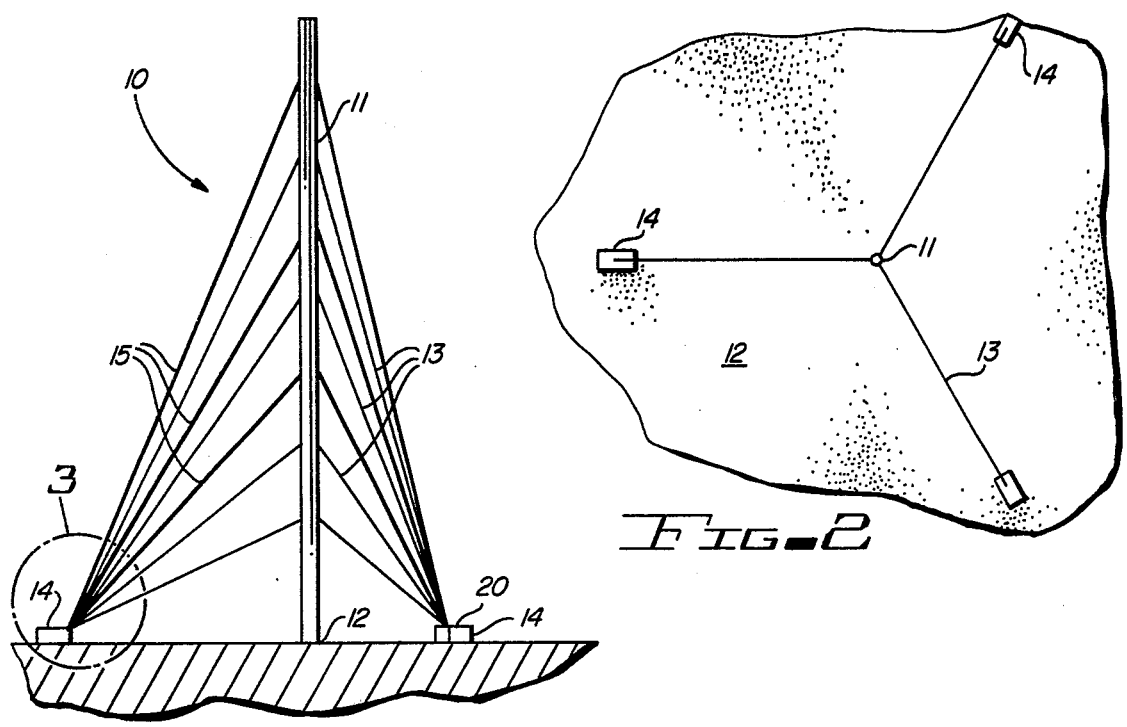
Fig-1
Fig-2
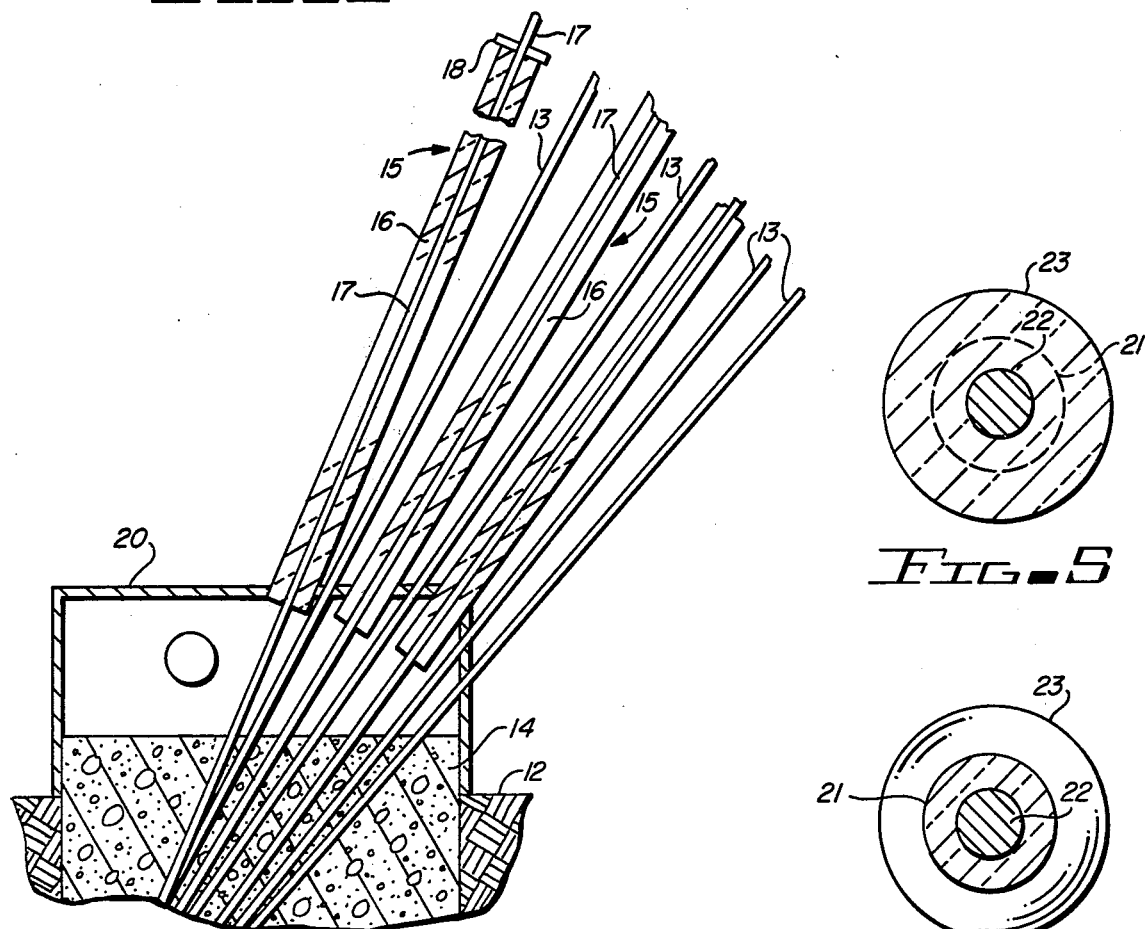
Fig-3
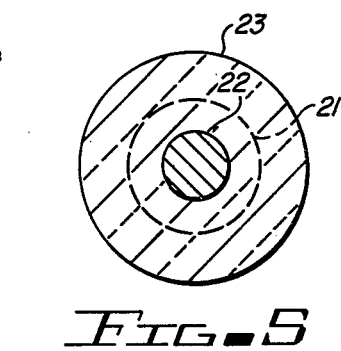
Fig-5
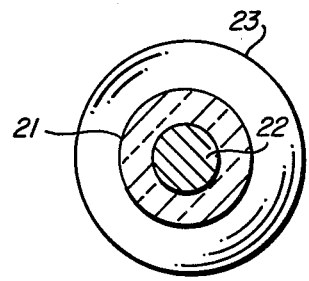
Fig-6

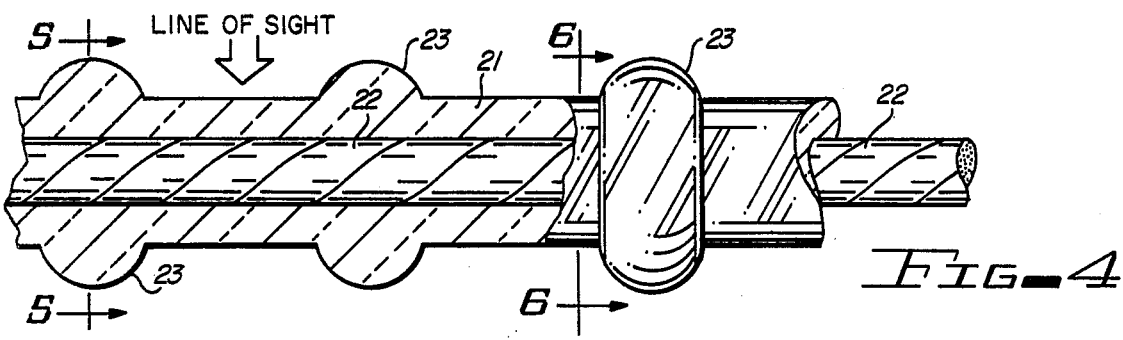
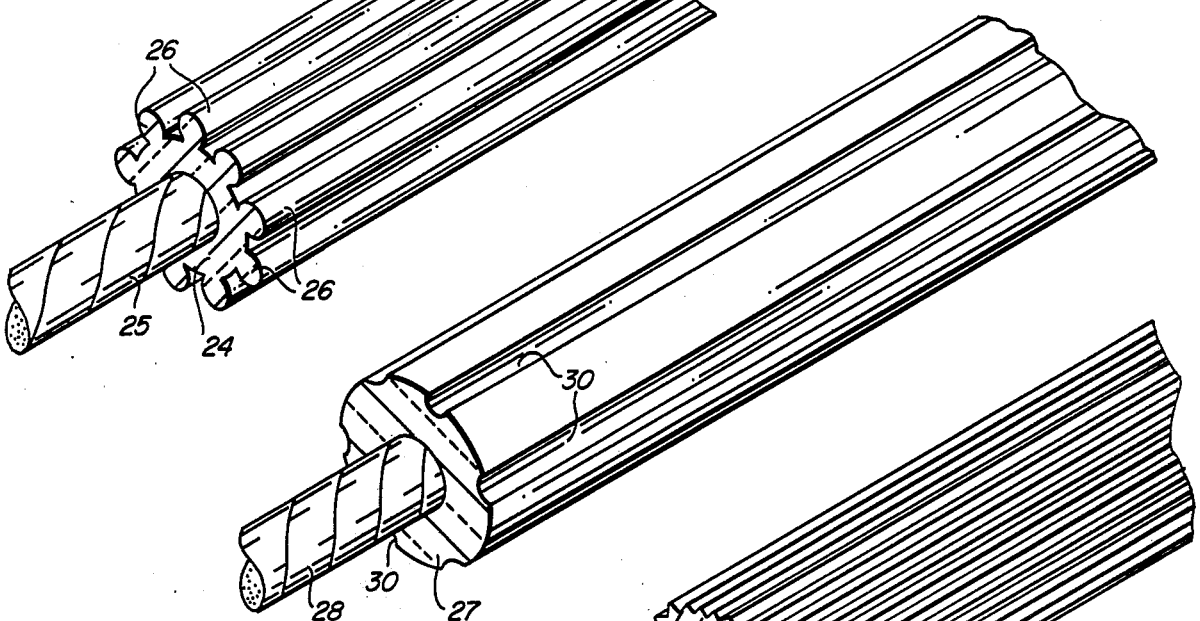
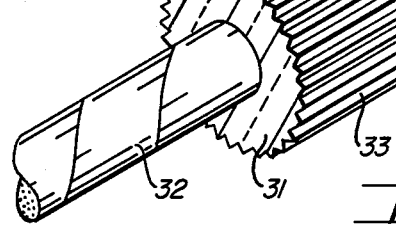
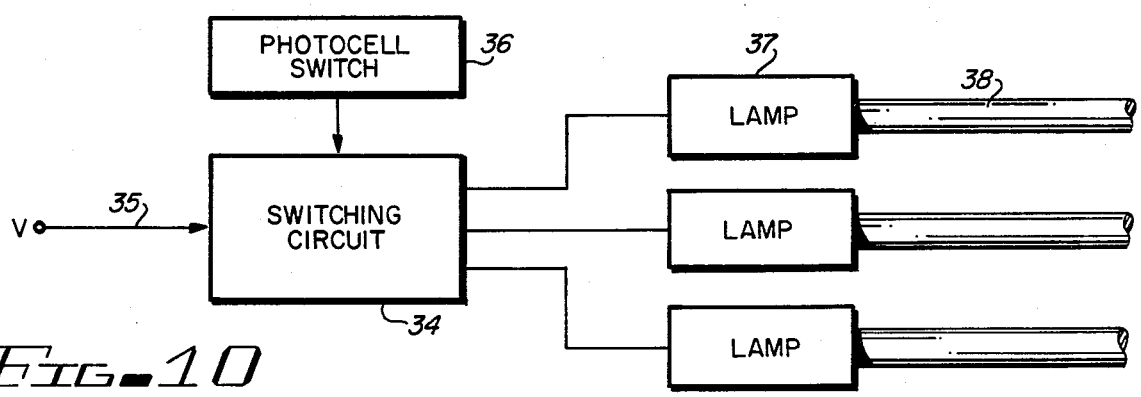

OBSTRUCTION WARNING SYSTEM

BACKGROUND OF THE INVENTION

The present invention relates to an obstruction warning system and especially to an obstruction warning for use with guy wires, or the like, such as used in communication towers for warning aircrafts of an obstruction.

In the past, it has been common to provide warning systems for communication towers, bridges and other obstructions to warn low-flying aircraft of the obstructions. A typical warning system includes a light, such as a red light, mounted on a tower or building, or the like, which light may be a flashing type light for drawing attention to the obstruction. In addition to a light mounted on top of the obstruction, lights sometimes are provided along a communication tower at different levels so that a low-flying aircraft can readily identify the tower. It has not been common in the past, however, to provide warning lights on guy wires supporting communication towers and this presents a problem for all aircraft which may readily identify the communication tower but normally may not be able to see the guy wires extending away from the tower. It may be possible to mount a series of lights along each guy wire for illuminating each guy wire, but this requires the firm mounting of the lights and electrical conductors along the guy wires which are subject to high winds and weather elements. In addition, repair of the lights or replacement of bulbs requires the use of sophisticated lift devices which radically increases the expense of changing bulbs or making repairs to the system.

The present invention is an obstruction warning system especially adapted to be attached to guy wires on communication towers, or the like, which utilizes a fiber optic or light tube, lighted by a single light source which may be mounted on a surface where it is readily accessible for lighting up the entire length, or a substantial portion of a length of a guy wire; and a light source which may be switched from one light tube to another to give an active blinking system with only passive elements mounted to the guy wires. The active elements are all mounted to the earth or other surface where they can be readily repaired. That is, a single source of intense light is used for illumination rather than the present multiplicity of luminars bordering a single element.

Typically, prior art obstruction warning systems can be seen in U.S. Pat. Nos. 4,126,850 and 2,066,928. Typical optical fiber tubes or rods for dispersing light or radiant energy can be seen in U.S. Pat. Nos. 4,195,907 for Light Conducting Fibers; 4,128,332 for an Illuminator; 4,052,120 for an Optical Apparatus for Producing a Light Curtain; and 4,247,858.

SUMMARY OF THE INVENTION

An obstruction warning system is provided with an elongated optical light path means having its volume capable of transmitting light therethrough and having means to interrupt the light along the light path to render the elongated light path means visible. It is defined that "volume" may include an air path. A high intensity light source is operatively connected to one end of each elongated optical light path and a reflector is connected or formed in the other end of the elongated optical path. Support means are provided for supporting the elongated optical light path means on a guy wire or to an obstruction. A plurality of elongated optical light paths will typically be provided for each obstruction and may be sequenced by a switching circuit switching individual high intensity light sources or one light source switching between several elongated optical light paths. Elongated optical light tubes may encircle individual guy wires.

BRIEF DESCRIPTION OF THE DRAWINGS

Other objects, features and advantages of this invention will be apparent from the written description and the drawings, in which:

FIG. 1 is an elevational view of a communication tower having guy wires and the present invention attached thereto;

FIG. 2 is a top plan view of a communication tower in accordance with FIG. 1;

FIG. 3 is a cutaway elevation of the light conducting tubes mounted on guy wires in accordance with the present invention;

FIG. 4 is a partial sectional view taken through one embodiment of a light conducting rod in accordance with the present invention;

FIG. 5 is a sectional view taken on the line 5—5 of FIG. 4;

FIG. 6 is a sectional view taken on the line 6—6 of FIG. 4;

FIG. 7 is a perspective view of a portion of an alternate embodiment of a light rod;

FIG. 8 is a perspective view of a portion of another light rod;

FIG. 9 is a perspective view of a portion of yet another light rod; and

FIG. 10 is a block diagram of a switching circuit for use in accordance with the present invention.

DESCRIPTION OF THE PREFERRED EMBODIMENTS

Referring to FIGS. 1 through 3, a communication tower 10 has an obstruction lighting system in accordance with the present invention.

The communication lighting tower has a tower 11 mounted to a surface 12 and having a plurality of guy wires 13. Guy wires 13 are connected along the tower 11 and are connected at a central point to the earth or to a concrete slab 14 attached to the earth.

As seen in FIG. 2, three sets of guy wires are mounted around the tower 11 and are equally spaced therearound. Each set of guy wires may extend typically one thousand (1,000) feet from the base of the communication tower. Each of the three sets of guy wires has three guy wires 15 which have a light conducting tube mounted thereover or thereto as shown in connection with FIG. 3.

In FIG. 3, three light conductive tubes 16 may be made of a translucent material, such as but not limited to, a polycarbonate polymer or glass, and are mounted directly over guy wires 17 to thereby not only provide support for the tower, but to support the light conducting tubes. Each tube 16 may have a reflecting end, such as an end mirror 18 mounted to one end. The other end has a casing 20 mounted to the guy wire 17 and having each of the light conducting tubes 16 connected thereto. The casing may have one high intensity light or laser reflecting into the three light conducting tubes 16 or separate high intensity lights for each light conducting tube; and may include an electrical circuit from switching each of the light conducting tubes on and off in sequence. A photo cell circuit can be used to actuate the lights at night and during inclement weather. The tubes 16 are designed with at least partial transparent surfaces, along with interruptions so that the tube is lighted up along its entire length either uniformly or with intensity varying at different portions. The light reaching the reflector 18 will then be reflected back into the tube so that the energy reaching the end is still utilized.

Turning now to FIGS. 4 through 9, several configurations of light conducting tubes are illustrated, but it should be clear that in addition to tubes having the guy wires mounted therein, bundles of fiber optic can also be utilized if desired.

The size of an object visible to the human eye is a function of a number of variables including background illumination, color, brightness, relative movement, intensity variation, pulsation rate, as well as other factors. Allard's Law, which relates to the intensity of light at the eye ($I_o$) as a result of a light intensity ($I_d$) at a distance (d) through air of transmissivity (t) governs the intensity necessary at the object being illuminated:

$$I_o \approx I_d(t^d/d^2)$$

When controlling the light emanating from an optical material transmitting light, Snell's Law governs. A critical angle $\phi$ exists between a normal to the boundary between two media of indices of refraction $\psi_1$ $\psi_2$, such that a light ray approaching the boundary at an angle exceeding the critical angle will be internally reflected.

$$\phi = \sin-1(\psi_1/\psi_2)$$

Thus, if a sharp interruption is introduced in a smooth surface between glass and air and if the glass is transmitting essentially parallel light rays, then the interruption surface will appear brighter than the surrounding boundary.

The embodiment in FIG. 4 has a hollow, at least partially transparent tube 21, which is mounted directly over a guy wire 22 and may be made of a translucent polymer material, such as a polycarbonate polymer or glass, and may be formed with a series of annular interruptions 23 spaced at regular intervals along the tubing 21. These interruptions in the smooth surface between the polymer and air will appear brighter in the surrounding atmosphere. FIG. 7 shows another light tube 24 having a guy wire 25 passing therethrough and having a surface with an elongated cylindrical interruption 26 for providing the illumination. FIG. 8 shows an embodiment of a light tube 27 mounted to a guy wire 28 and having elongated grooves 30 running along the central axis of the guy wire and formed in a polymer tube 27.

Another embodiment is illustrated in FIG. 9 having a polymer or glass tube 31 mounted over a guy wire 32 and having a roughened surface 33 which may be shaped similar to the surface of a fresnel lens in a zig-zag pattern for increasing the emission of light from the tube along its surface.

FIG. 10 shows a simplified block diagram in which a switching circuit 34 has an electrical voltage 35 applied thereto for driving the circuit and is connected to a photo cell switch 36 which can actuate the switching circuit 34 during any low light conditions, such as at night time or in inclement weather. The switching circuit alternately applies electrical energy to three lamps 37, sequentially actuating each lamp which powers a high intensity light beam into a fiber optic tube 38 which in turn is connected to the light tube or rod attached to the guy wire or obstruction. Any commercially available switching circuit can be used as well as any commercial photo cell for actuating the relays for driving the lamps 37. However, it should be clear that the switching circuit could also be used to rotate a high intensity lamp in steps or to rotate mirrors to use a single high intensity lamp for a plurality of light tubes without departing from the spirit and scope of the invention.

It should be clear at this time that an obstruction warning system has been provided for use on communication towers, or the like, but it should also be clear that the warning system is adapted for use in a wide variety of situations where visible lighting is required for aircraft or the like. Accordingly, the present invention is not to be construed as limited to the forms shown, which are to be considered illustrative rather than restrictive.

We claim:

1. An obstruction warning system comprising in combination:

elongated optical light path means having a volume capable of transmitting light therethrough;
   at least one light source operatively connected to one end of said optical light path means for directing a light thereinto;
   reflecting means attached to the other end of said elongated optical light path means for reflecting light from said light source;
   support means for supporting said optical light path means in a predetermined position adjacent an obstruction; and
   means to interrupt light from said light source along said optical path means to produce increased visibility of said elongated optical light path means.

2. An obstruction warning system in accordance with claim 1, in which said elongated optical light path means includes a plurality of elongated optical light tubes each attached to individual guy wires.

3. An obstruction warning system in accordance with claim 2, in which each of said plurality of elongated optical light tubes has a guy wire passing therethrough.

4. An obstruction warning system in accordance with claim 3, in which said light source includes at least one laser.

5. An obstruction warning system in accordance with claim 3, in which said light source includes at least one high intensity discharge lamp.

6. An obstruction warning system in accordance with claim 1, including a switching circuit connecting to a plurality of light sources to sequentially actuate said light sources to operate each light source separately.

7. An obstruction warning system in accordance with claim 6, in which said switching circuit includes photo cell switching means for actuating said light sources only in low light conditions.

8. An obstruction warning system in accordance with claim 2, in which said means to interrupt light along said optical path means includes a plurality of annular raised surfaces equally spaced along each said elongated optical light path tube.

9. An obstruction warning system in accordance with claim 2, in which said means to interrupt light along said optical path means includes cylindrical shaped elongated interruptions formed along the surface of each elongated optical light path tube.

10. An obstruction warning system in accordance with claim 2, in which said means to interrupt light along said optical path means includes grooves formed in each elongated optical light path tube.

11. An obstruction warning system in accordance with claim 2, in which said means to interrupt light along said optical path means includes an elongated optical light path tube having a roughened surface for dispersing light passing therethrough.

* * * * *